United States Patent
Harris

(10) Patent No.: US 8,347,367 B1
(45) Date of Patent: *Jan. 1, 2013

(54) TECHNIQUES FOR ENTRY OF LESS THAN PERFECT PASSWORDS

(75) Inventor: Scott C. Harris, Rancho Santa Fe, CA (US)

(73) Assignee: Harris Technology, LLC, Racho Santa Fe, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/015,103

(22) Filed: Jan. 27, 2011

Related U.S. Application Data

(63) Continuation of application No. 12/264,195, filed on Nov. 3, 2008, now Pat. No. 7,882,551, which is a continuation of application No. 11/033,012, filed on Jan. 10, 2005, now Pat. No. 7,467,403.

(60) Provisional application No. 60/535,204, filed on Jan. 9, 2004.

(51) Int. Cl.
G06F 21/00 (2006.01)
H04L 9/32 (2006.01)
(52) U.S. Cl. ............ 726/6; 726/7; 726/18; 726/19
(58) Field of Classification Search ............... None
See application file for complete search history.

(56) References Cited

U.S. PATENT DOCUMENTS

| | | | |
|---|---|---|---|
| 4,138,719 A | 2/1979 | Swanstrom et al. | |
| 4,926,491 A | 5/1990 | Maeda et al. | |
| 5,365,574 A | 11/1994 | Hunt et al. | |
| 5,394,471 A | 2/1995 | Ganesan et al. | |
| 5,430,827 A | 7/1995 | Rissanen | |
| 6,026,491 A | 2/2000 | Hiles | |
| 6,094,632 A | 7/2000 | Hattori | |
| 6,263,447 B1 | 7/2001 | French et al. | |
| 6,282,658 B2 | 8/2001 | French et al. | |
| 6,321,339 B1 | 11/2001 | French et al. | |
| 6,560,352 B2 | 5/2003 | Rowe et al. | |
| 6,857,073 B2 | 2/2005 | French et al. | |
| 7,165,267 B1 * | 1/2007 | Utsumi et al. | 726/2 |
| 7,234,156 B2 | 6/2007 | French et al. | |
| 7,302,581 B2 * | 11/2007 | Utsumi et al. | 713/183 |
| 7,467,403 B2 | 12/2008 | Harris | |
| 7,882,551 B2 * | 2/2011 | Harris | 726/6 |
| 2007/0203850 A1 * | 8/2007 | Singh et al. | 705/67 |
| 2009/0158406 A1 | 6/2009 | Jancula et al. | |
| 2010/0122350 A1 * | 5/2010 | Munje et al. | 726/28 |
| 2010/0125906 A1 * | 5/2010 | Golle et al. | 726/18 |
| 2012/0143706 A1 * | 6/2012 | Crake et al. | 705/18 |

FOREIGN PATENT DOCUMENTS

| | | |
|---|---|---|
| EP | 0856836 A2 | 8/1998 |
| WO | 02084605 A2 | 10/2002 |

* cited by examiner

*Primary Examiner* — Christopher Revak
(74) *Attorney, Agent, or Firm* — Law Office of Scott C. Harris, Inc.

(57) ABSTRACT

A technique of allowing entry of the password which is not 100% correct. This password would be used to verify identity and/or login information in low security techniques. The password is scored relative to the correct password. The scoring can take into effect least mean squares differences, and other information such as letter groups, thereby detecting missed characters or extra characters, as well as shift on the keyboard.

13 Claims, 2 Drawing Sheets

TECHNIQUES FOR ENTRY OF LESS THAN PERFECT PASSWORDS

CROSS RELATED APPLICATIONS

This application is a continuation application of application Ser. No. 12/264,195, filed Nov. 3, 2008, now U.S. Pat. No. 7,882,551; which is a continuation of Ser. No. 11/033,012 filed Jan. 10, 2005, now issued as U.S. Pat. No. 7,467,403 issued Dec. 16, 2008 which claims priority to U.S. Provisional Application No. 60/535,204 filed Jan. 9, 2004.

BACKGROUND

Passwords are used as a form of personal identification to allow a user access to a specified resource.

Security can be balanced against the inconvenience to a user for accessing that security. For example, it may be inconvenient for a user to enter long or difficult passwords. The need to enter a difficult password is inconvenient to the user. However, the user may accept that difficulty, because of the need to maintain the security of a transaction or database.

Passwords can secure access to specified resources. The resource can be, for example, a local computer system, or a web site or membership site which requires access, or even physical access to a premises. Sometimes, however, less security may be needed. For example, certain web sites require login, but only allow a user access to less personal and/or secure information. For example, a web site may require login to receive news or other personalization information. Also, sometimes log in to a web site may be dependent on the actual computer that is being logged in, in which case it is unlikely that an unauthorized user is actually logging in.

Other situations where the odds of unauthorized entry are low include a web site where a timeout has occurred after certain amounts of time. In all of these situations, it may be desirable to accept lower security.

Passwords, as described herein, may take different forms, and may include, for example, an alphanumeric password, a personal identification number or "pin", or specified sequences of other types.

SUMMARY

The present application teaches acceptance of a password which is less than perfect, so long as the difference between the entered password and the actual password meets certain criteria.

According to one aspect, the entered password is correlated against the correct password, using image correlation techniques, and a least means squares difference is obtained. So long as the least means squares difference is less than a specified amount, access to the resource is granted.

According to another aspect, a determination is made up how many letters are incorrect, and patterns of incorrect letters. For example, a position on the keyboard is determined, or an extra letter, or a missing letter.

BRIEF DESCRIPTION OF THE DRAWINGS

These and other aspects will now be described in detail with reference to the accompanying drawings, wherein.

DETAILED DESCRIPTION

Figure 1:
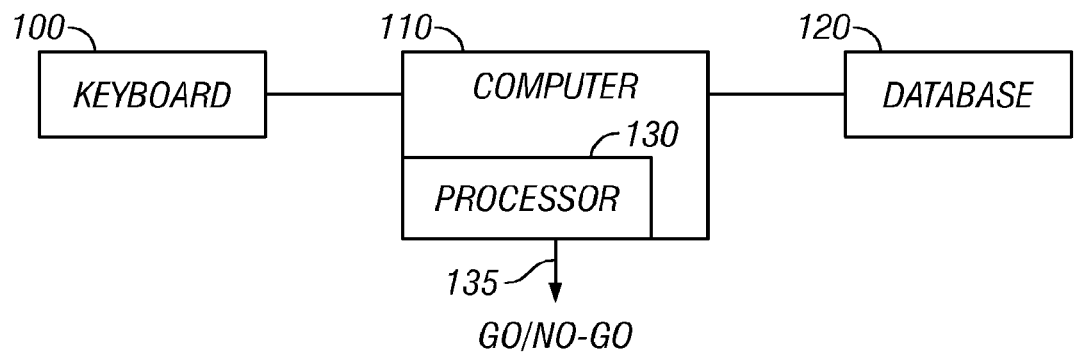
FIG. 1 shows a basic block diagram of the system.

The basic system is shown in FIG. 1. A user interface 100, such as a keyboard, is connected to a general or specific purpose computer 110. The computer can be, for example, a special access device which is configured only to allow access to a specified resource. For example, the computer can be a specific purpose entry granting device. The computer is also connected to a database 120 which stores information indicative of correct password(s). The computer includes a processing part 130 that processes the password entered on the keyboard against the password entered in the database to produce a go/no go indication shown as 135. This go/no go indication may be part of a signal that controls the access to the resource.

Figure 2:
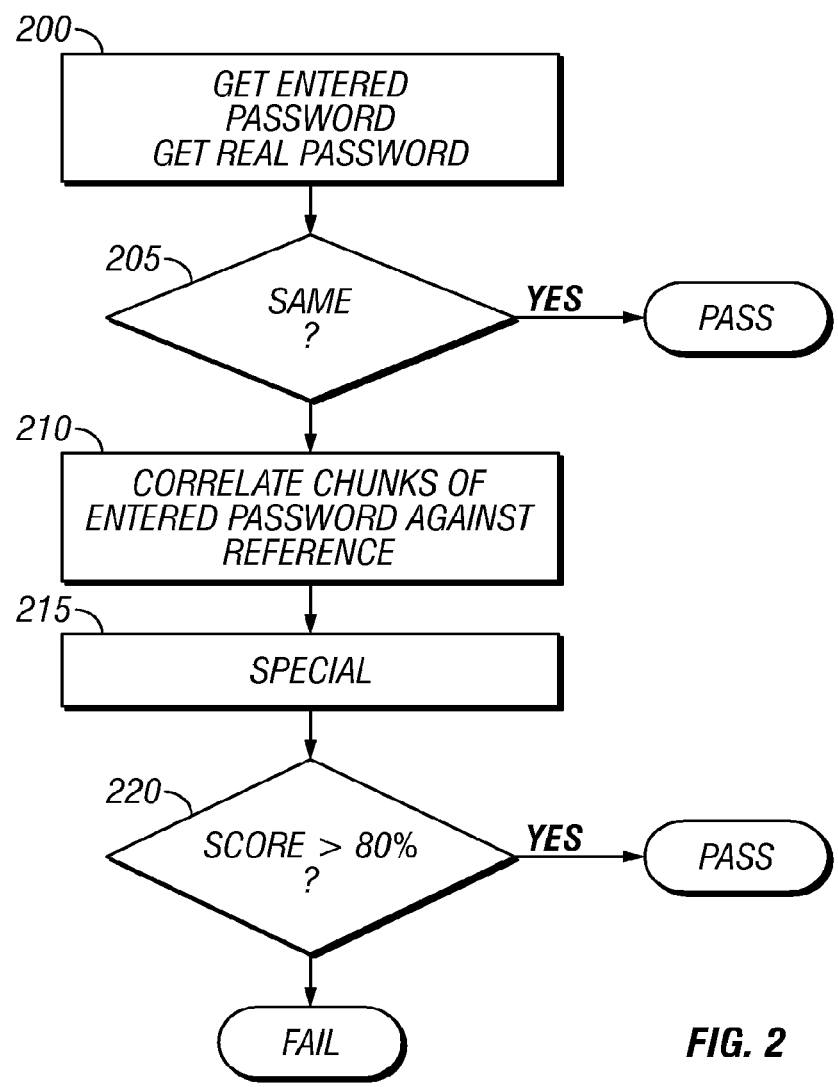
FIG. 2 shows a flowchart of password acceptance for the system.

The computer processor operates according to the specific flowchart shown in FIG. 2. At 200, the computer gets the entered password and actual password. 205 determines if the passwords are identical, and if so signals a pass. However, if the passwords are not identical, then 210 uses image correlation techniques to correlate chunks of the entered password against the reference password. That is, even though the entered password is text, it is treated as being different blocks of sequences, and the pattern of those sequences is compared against the pattern of sequences in the actual password. This technique is analogous to the way that an image is processed. For example, letters and locations may be correlated against each other, followed by neighborhoods, 2 letter groups, 3 letter groups and the like.

Figure 3:
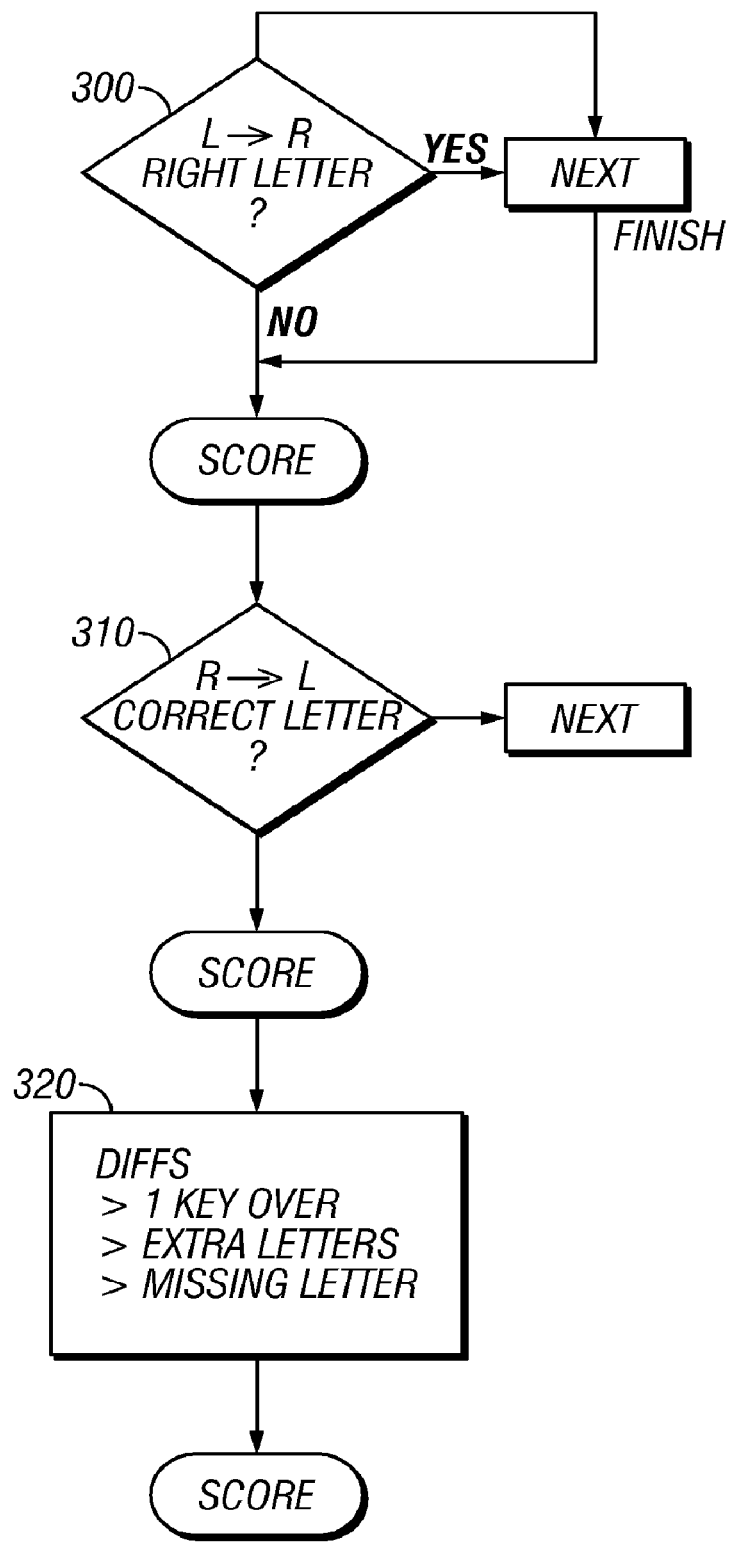
FIG. 3 shows a flowchart of scanning the password to determine correlation with the correct password.

The correlation may be used to determine a least mean squares distance between the entered password and the reference password. Many different ways of finding the least mean squares difference are known, and any of these techniques may be used. However, a specific technique is described herein with reference to FIG. 3. Special processing techniques are carried out at 215, a special processing technique being techniques which are specific to the entry of data via a keyboard. This produces a score which is output. The score is compared with a specified value, here 80%. If the score is higher than 80%, then access to the resource is granted. If the score is lower than 80%, then access to the resource is denied. A specific technique of correlating is shown in FIG. 3. Note that this correlation need only be carried out if exact matches between the passwords are not found.

FIG. 3 shows a system which correlates along the letter from left to right (300) then right to left (310). This determines the number of exact matches between letters both at the beginning and end of the word. At 320, the differences between the letters are analyzed. These differences may include whether the letter that was entered was shifted on the keyboard relative to where it should be, whether there was an extra letter, or whether there was a missing letter. These most common errors are accommodated in this way. Each of the different errors is associated with a score, and the overall score is used as the output value.

Other modifications are possible. For example, while least mean squares has been described, it should be understood that any technique which can be used to analyze patterns of sequences, and more specifically, any technique which has been used to analyze/identify images or portions of images, can be used in this system. This system uses a "good enough" measure to determine whether the password that is entered sufficiently closely matches the stored password, in a way which provides reasonable, but not perfect certainty that the user has entered the correct password. Other embodiments are contemplated, and the disclosure is intended to encompass all embodiments and modifications which might be predictable based on the disclosed subject matter. Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. An apparatus, comprising:
a computer device that accepts information which has been entered as entered access information;
said computer device comparing said entered information which has been entered with stored information to determine if said entered information matches exactly with the stored information,
said computer device operating if said entered information matches exactly with the stored information to accept said entered information,
said computer device operating if said entered information does not match exactly with the stored information to first compare a first part of the entered information with at least one section of the stored information and to second compare a second part of the entered information, representing a separate part of the information than said first part, with at least one other section of the stored information different than the at least one section, and to determine at least one distance between the parts of the entered information and the sections of the stored information, and based on said at least one distance being determined by said first compare and said second compare carried out by said computer device, to accept the entered information when the entered information does not match exactly with the stored information, based on the distance being less than a specified amount,
said computer device providing access to at least one computer function responsive to accepting the entered information.

2. An apparatus as in claim 1, wherein said first compare and said second compare compares patterns of the parts with patterns in areas of the stored information.

3. An apparatus as in claim 2, wherein letters and locations in the parts are compared against letters and locations in the stored information.

4. An apparatus as in claim 2, wherein neighborhoods in the parts are compared against neighborhoods in the stored information.

5. An apparatus as in claim 1, wherein said parts are n letter groups forming the parts that are compared against corresponding n letter groups in the stored information.

6. An apparatus as in claim 1, wherein said first compare and said second compare are relationships that take into account an analysis of common keyboarding errors.

7. An apparatus, comprising:
a computer device that accepts information which has been entered as entered access information;
said computer device comparing said entered information which has been entered with stored information to determine if said entered information matches exactly with the stored information,
said computer device operating if said entered information matches exactly with the stored information to accept said entered information, said computer device operating if said entered information does not match exactly with the stored information to first compare a first part of the entered information with at least one section of the stored information and to second compare a second part of the entered information, representing a separate part of the information than said first part, with at least one section of the stored information, and to determine at least one distance between the parts of the entered information and the sections of the stored information, and based on said at least one distance being determined by said first compare and said second compare, to accept the entered information when the entered information does not match exactly with the stored information,
said computer device providing access to at least one computer function responsive to accepting the entered information, wherein said computer device determines a least mean squares difference between the entered information and the stored information, and computer determines a match from an amount of said least mean squares difference.

8. An apparatus as in claim 7, wherein said computer determines said match from an amount of least mean squares difference that represents a match of 80% or better.

9. An apparatus as in claim 1, wherein said entered information is a pattern of information entered into a user interface.

10. A computer readable non-transitory storage medium containing a set of instructions for a general-purpose computer, the set of instructions comprising:
instructions to obtain first information which represents a user's access to an access-controlled item on the computer;
instructions to compare the first information with at least one stored item of information representing authorized access information;
where said instructions to compare comprise comparing a pattern of the first information, with a pattern of the stored item of information and instructions to accept the first information to provide said access when said pattern of said first information matches said stored item of information, wherein said instructions to accept comprise providing said access when said pattern of said first information is not exactly the same as the stored item of information, but a least mean squares distance between said pattern of said first information and said pattern of said stored item of information is less than a specified non-zero value.

11. A computer based apparatus comprising:
a computer having a user interface which controls entry of first information, said first information which represents a user's access to at least one access-controlled resource on the computer, said computer having a processor which operates to compare said first information with at least one stored item of information representing authorized access information, by comparing a pattern of the first information as entered, with a pattern of the stored item of information and said computer operating to accept the first information to provide said access when said pattern of said first information matches said stored item of information, wherein said computer operates to provide said access when said pattern of said first information is not exactly the same as the stored item of information, but a least mean squares distance between said pattern of said first information and said pattern of said stored item of information is less than a specified non-zero value.

12. A computer based apparatus comprising: a computer having a user interface which controls entry of first information, said first information which represents a user's access to at least one access-controlled resource on the computer, said computer having a processor which operates to compare said first information with at least one stored item of information representing authorized access information, by comparing a pattern of the first information as entered, with a pattern of the stored item of information and said computer operating to accept the first information to provide said access when said pattern of said first information matches said stored item of information, wherein said computer also operates to provide said access when said pattern of said first information does not match said stored item of information, but a distance between parts of said pattern and parts of said stored item of information is less than a specified amount.

13. A computer readable non-transitory storage medium containing a set of instructions for a general-purpose computer, the set of instructions comprising:

instructions to obtain first information which represents a user's access to an access-controlled item on the computer;

instructions to compare the first information with at least one stored item of information representing authorized access information;

where said instructions to compare comprise comparing a pattern of the first information, with a pattern of the stored item of information and instructions to accept the first information to provide said access when said pattern of said first information matches a pattern of said stored item of information, wherein said instructions also determine at least one distance between said stored item of information and said first information and said instructions to accept the first information, provide said access when a distance between said stored item of information and said first information is greater than zero, but less than a specified amount in addition to when said pattern of said first information matches said stored item of information.

* * * * *